Feb. 23, 1965
YOSHIYA ONO
3,171,058
VELOCITY ACTUATED VEHICULAR HEADLIGHT CONTROL SYSTEM
Filed April 4, 1961
2 Sheets-Sheet 1
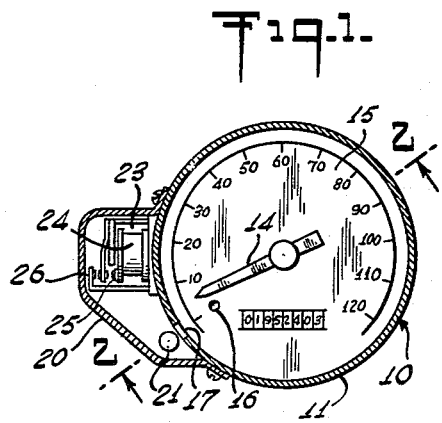
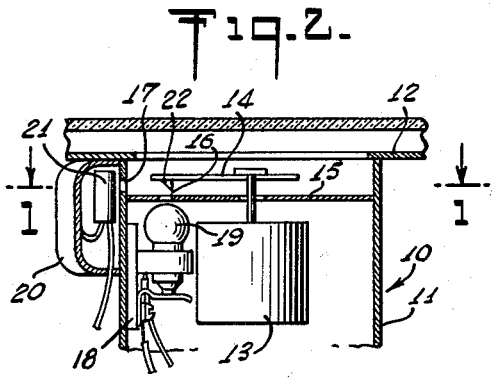
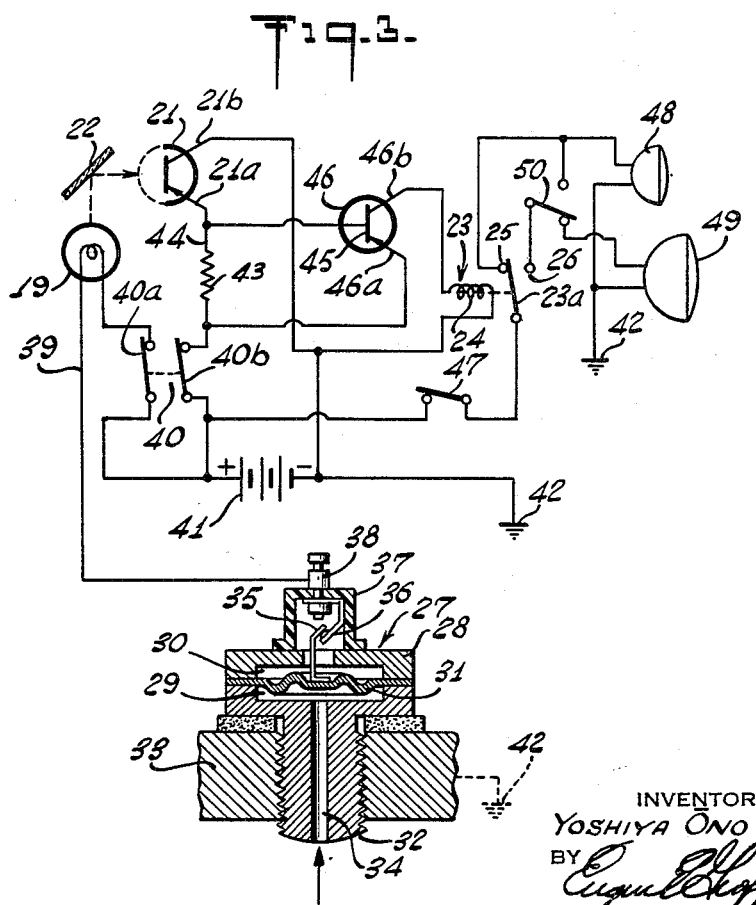
INVENTOR
YOSHIYA ONO
BY
ATTORNEY

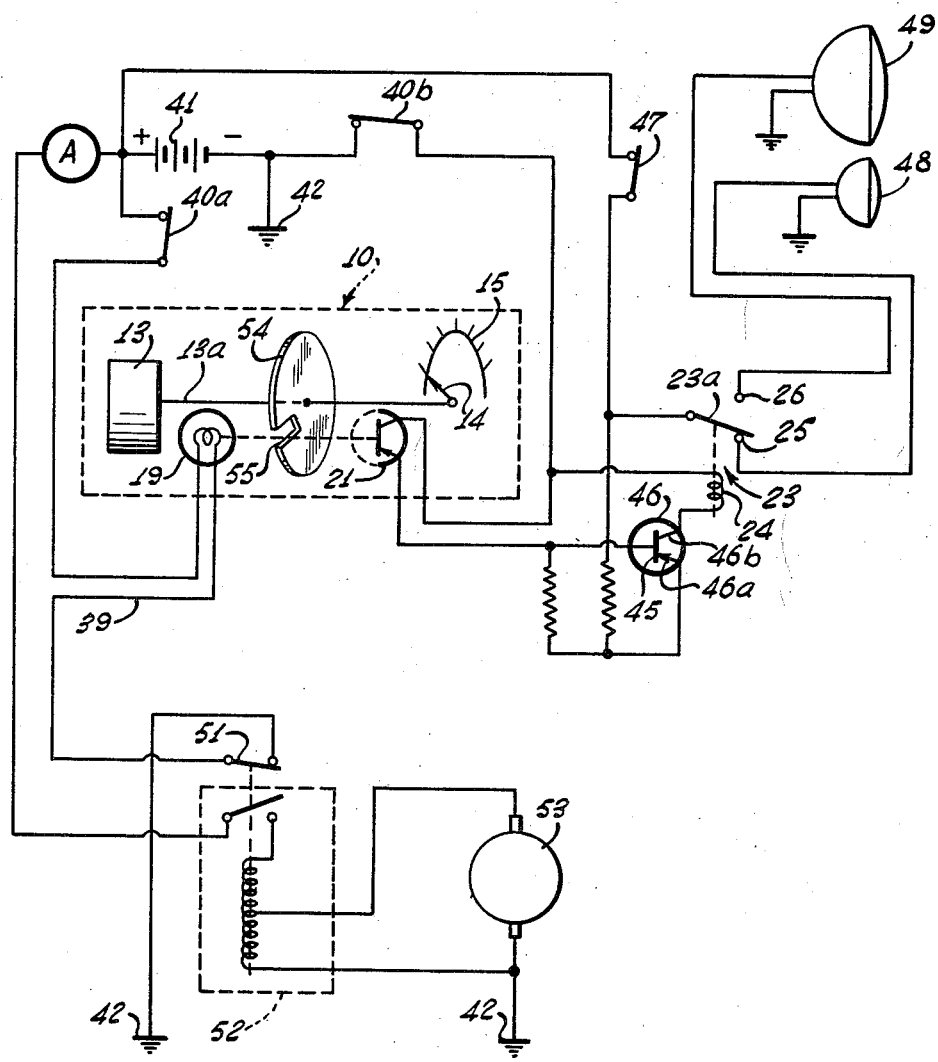

United States Patent Office 3,171,058
Patented Feb. 23, 1965

1

3,171,058
VELOCITY ACTUATED VEHICULAR HEADLIGHT
CONTROL SYSTEM
Yoshiya Ono, 2-652 Shimotoda, Nishiwaki-shi,
Hyogo-ken, Japan
Filed Apr. 4, 1961, Ser. No. 100,743
10 Claims. (Cl. 315—78)

The present invention pertains to improvements in automatic headlight control systems.

In the operation of vehicles such as automobiles and trucks equipped with high powered main and relatively low-powered auxiliary headlights, the obvious normal procedure is to employ the auxiliary lights when a vehicle is stopped and the main lights throughout running periods. The usual manual switch-overs between lighting conditions place added duties on the driver just at the times when his attention may necessarily be most concentrated on other functions required in maneuvering or preparing to maneuver the vehicle. In addition to placing this burden on the driver's attention, such manual control is subject to the frailties of human nature by which inadvertence may readily lead to dangerous or embarrassing situations, typically in the cases of fatigued or inexperienced drivers.

An object of the present invention is to eliminate the above and related disadvantages by rendering brightness changes automatic, i.e., under control of the operating conditions directly rather than through conscious attention and effort by the driver. Two operational characteristics of the vehicle available to effect such control are the speed of the vehicle itself and the rotational speed of the latter's engine. However, control by either one of these characteristics alone may lead to unwanted results in certain driving situations. For example, if car speed alone is employed to provide the normally required low illumination during stops or at slow speeds and the full illumination at higher speeds, the bright illumination becomes unavailable under circumstances wherein it may most be needed, such as starting from a difficult position or in low-speed climbing of steep and dangerous grades. On the other hand, if engine speed is the sole controlling factor, a drop to low or idling r.p.m. of the engine, as in coasting down grades or in traffic, can cause a switch from bright to low illumination irrespective of how fast the car may be travelling, with obviously perilous possibilities. In view of the above factors, therefore:

A further object of the invention is to provide an automatic headlight control system in which both the characteristics of vehicle speed and engine speed are utilized jointly to effect appropriate changes in illumination.

A further object is to provide an automatic control system in which factors of vehicle speed and engine r.p.m. are effective jointly in overlapping operational ranges to prevent unwanted changes in headlight brightness.

A further object is to provide an automatic control system including means for switching between high and low powers of a vehicle's headlight operation, and dual means responsive respectively to normal functions of engine operation and vehicle speed indication to actuate the switching means.

A further object is to provide a system for automatically controlling the brightness of a motor vehicle's headlight illumination jointly in response to engine lubricant pressure and speedometer indicational position.

A further object is to provide means for automatically controlling the headlight operation of a vehicle dually

2 in response to speedometer indicational position and engine-driven generator output characteristic.

A further object is to provide an automatic headlight control system which is simple, reliable under all operational conditions, and which is adapted to advantageous combinational use of various pre-existing instrumentalities without impairing their usual functional accuracies.

Other objects and advantages of the invention will become evident during the course of the following description in connection with the accompanying drawings, in which—

FIGURE 1 is a transverse vertical sectional view of a speedometer combination for use in one embodiment of the invention;

FIGURE 2 is a diagonal sectional view of the same generally in the plane 2—2, FIGURE 1;

FIGURE 3 is a semi-diagrammatic view of the control system embodying the speedometer combination of FIGS. 1 and 2 together with a lubricant pressure detector; and FIGURE 4 is a diagrammatic illustration of the system embodying an alternative form of speedometer combination and an electrical output detector connected to an engine-driven generator.

Referring to FIGS. 1 and 2, the numeral 10 generally designates a speedometer having a casing 11 attached to the usual instrument panel 12, and containing an actuating component 13 of any suitable type adapted to swing an indicating hand 14 in registry with a calibrated dial 15. The dial 15 has a small aperture 16 located in position to underlie the hand 14 when the latter is in or near zero speed position, while a second aperture 17 is provided in the casing 11 forwardly of the dial 15 in radial alignment with the aperture 16. A fixture 18, secured in the casing 11, supports a small electric lamp 19 directly behind the dial aperture 16. An exterior housing 20 contains a light-sensitive valving element 21, preferably a photo-transistor, disposed in radial registry with the aperture 17. A small mirror 22, FIG. 2, is secured to the hand 14 at such an angle that when the hand is in zero or near zero position and the lamp 19 is illuminated, light passing through the dial aperture 16 is reflected through the aperture 17 to the element 21. A double-throw relay 23, having a magnet coil 24 and normally open and closed contacts 25 and 26, respectively, may also be enclosed in the housing 20 as shown in FIG. 1.

In FIGURE 3, the numeral 27 generally denotes a pressure detector having a hollow body 28 divided interiorly into inner and outer chambers 29 and 30 by a resilient metallic sealing diaphragm 31. A shank 32, threaded through a wall 33 of the pressure side of the vehicle engine's lubricating side at any convenient location, has a central passage 34 connecting the lubricating system with the inner detector chamber 29. The diaphragm 31 carries an outwardly extending contact finger 35 angularly over-lapping and normally engaging a second contact member 36, the latter being secured in an insulating cup 37 and electrically connected to an exterior binding post 38. One terminal of the lamp 19 is connected by suitable conducting means 39 to the binding post 38, while the second lamp terminal is adapted to be connected via the portion 40a of a double-pole switch 40 to the positive side of the vehicle's storage battery 41, the negative side of the battery being grounded at 42.

The second portion 40b of the switch 40 is adapted to connect the positive side of the battery 41 through a resistor 43 and a conductor 44 to the emitter 21a of the photo-transistor 21, the latter's collector 21b being connected to ground. The emitter 21a is also connected to the base 45 of an amplifier transistor 46 having an emitter 46a adapted to be connected to battery positive via the portion 40b of switch 40 as shown. One terminal of the relay magnet coil 24 is connected to the collector 46b of the transistor 46, and the second magnet terminal is led to ground. A manual master switch 47, when closed as shown, connects battery plus to the common movable electrode 23a of the relay 23. The inner or normally open contact 25 of the relay is connected to the small or low powered headlights 48, while the outer contact point 26 is normally connected via a manual selector switch 50 to the main headlights 49.

For simplicity in illustration only one headlight of each power is shown, but it will be understood that these are diagrammatically representative of the usual pairs.

In operation, closure of the switch 40 sets the system for automatic control. Assuming the master light switch 47 to have been closed, the controlling action is as follows:

If the vehicle is at rest and the engine stopped or running slowly, the lamp 19 is lighted, its circuit being completed to ground via the conductor 39, the closed contacts 35 and 36, the diaphragm 31, the body 28, the shank 32, and the lubricating system wall 33; the closed state of the contacts 35 and 36 is due to the fact that at low engine speed insufficient pressure exists in the lubricating system to overcome the resilient resistance of the diaphragm 31. Since with the vehicle at rest the speedometer hand holds the mirror 22 in registry with the apertures 16 and 17, FIG. 2, light from the lamp 19 is reflected to the photo-transistor 21 which is thereby activated. Output of the photo-transistor, amplified via the second transistor 46, energizes the relay magnet 24, causing the common electrode 23a to engage the contact point 25 and thus establish an energizing circuit from the battery 41 through the small headlights 48, the circuit being completed through ground 42 in the usual manner. It will be evident from the described relationship that the low powered lights 48 will remain turned on and the high powered lights 49 will remain turned off as long as the photo-transistor 21 is supplied with light from the lamp 19. When the vehicle is to be started, the accompanying acceleration of the engine causes an increase in the latter's lubricating pressure which flexes the diaphragm 31 outward, disengaging the contacts 35 and 36 to extinguish the lamp 19 by breaking its previously described ground connection. The consequent loss of activating light for the photo-transistor 21 disables the energizing circuit of the relay 23, which thereupon drops out, allowing the common electrode 23a to swing from contact 25 to contact 26 and thereby divert the battery current from the low-powered auxiliary headlights 48 to the main lights 49.

By the above means the full power of the main headlights 49 is automatically applied during the start of the vehicle from rest. During acceleration and throughout subsequent travel the lubricant pressure detector 27 prevents relighting of the lamp 19 so long as the engine continues at driving speed. If while the vehicle is moving at significant speed the engine speed is reduced to or near idling r.p.m. as in coasting, etc., the drop in lubricant pressure permits the diaphragm 31 to close the contacts 35 and 36, again turning on the small lamp 19. However, under such running conditions the motion of the vehicle has swung the speedometer hand 14 away from its zero position, shifting the attached mirror 22 out of registry with the apertures 16 and 17, FIGS. 1 and 2. Consequently no light from the lamp 19 is reflected to the photo-transistor 21, so that the relay 23 remains de-energized and the main headlights 49 continue in operation, the interposition of speedometer-actuated control factor thus preventing undesired shifts to low headlight power which could occur if control were exercised by engine speed alone. On the other hand, under driving conditions such as the previously mentioned climbing of steep and dangerous grades in low gear ratio at vehicle speed insufficient to move the mirror 22 entirely out of effective registry with the apertures 16 and 17, the factor of relatively high engine speed and consequent lubricant pressure operates via the detector 27 in the manner previously described to prevent any automatic shift from high to low illumination. Finally, when the vehicle is brought to a stop with engine idling, for example at traffic intersections, the combination of low engine speed and low speedometer position activates the circuit of the relay 24 as also previously set forth, switching the system from high to low headlight operation during the stop period.

From the foregoing it will be evident that the two factors of vehicle speed and engine speed are applied in cooperative and modifying combination to provide automatically the proper intensity of headlight illumination under all normal driving conditions. Obviously, in exceptional situations not suited to automatic light control, for example when driving in restricted zones in which local ordinances require the use of low headlights only, the automatic control system may be turned off by opening the switch 40, after which the required set lighting condition may be established by means of the manual selector switch 50.

The embodiment shown diagrammatically in FIG. 4, while adapted to supply proper automatic light control under various driving conditions in substantially the manner set forth above, illustrates alternative means to utilize the factor of engine speed in affecting the joint control. In this illustration of the device the lubricant pressure detector switch of FIG. 3 is replaced by a normally closed pair of contacts 51 applied to the cut-out relay 52, the latter being interposed in the usual manner between the engine-driven generator 53 and the storage battery 41. For clarity the charging system including the relay 52 is shown in simplest form, but it will be understood that the contact pair 51 may be similarly applied to the equivalent relay element in systems involving more complication. The well-known primary operation of such relays is to lock in and maintain the circuit from generator to battery during charging conditions, but to drop out and break the circuit against reverse flow when the generator voltage falls below that of the battery, i.e., at low engine speeds such as idling. In the present invention the added contact pair 51 is included in the ground circuit connection of the small lamp 19, the latter's other terminal being connected via the switch pole 40a to positive battery in the same manner as in FIG. 3.

FIG. 4 also illustrates an alternative arrangement of the light-actuated detecting means in the speedometer 10. In this form speedometer spindle 13a carries a shutter disk 54 interposed between the lamp 19 and the photo-transistor 21. A radial slot 55 in the disk 54 is so oriented as to provide a direct optical path from the lamp to the photo-transistor when the speedometer hand is in zero speed position. Assuming the engine and hence the generator 53 to be running at low or idling speed, the relay 52 is in cut-off position as shown, the contact pair 51 being closed to complete the circuit through the lamp 19 so that the latter is energized. Further assuming that the vehicle is stopped or moving at very low speed, the slot 55 in the disk 54 permits light from the lamp 19 to pass directly to the photo-transistor 21, causing the latter to operate via the amplifier transistor 46 to energize the relay 23 and thereby switch on the auxiliary headlights 48 in the manner previously described. As the engine is speeded up the relay 52 locks in, opening the contact pair 51 to extinguish the lamp 19. Loss of light supply to the photo-transistor 21 de-energizes the magnet circuit of the relay 23 which thereupon switches off the auxiliary headlights 48 and turns on the main headlights 49. As the vehicle gains and maintains driving speed the swing of the shutter slot 55 out of zero position cuts off any possible passage of light to the photo-transistor 21, thereby preventing undesired changes from high to low headlighting in case the engine speed is lowered as in coasting. Similarly, during particular driving conditions requiring relatively high engine speed with low vehicle speed as previously mentioned, the open state of the contacts 51 disables the lamp 19 so that any undesired shift to low illumination is prevented.

From the foregoing it will be evident that the two arrangements shown in FIGS. 3 and 4 have the same automatic control characteristics cooperatively established in each case by the factors of vehicle speed and engine speed. While the speedometers are shown as being of the stationary dial type, it is obvious that the same general operational combination can be applied to other types such as those employing moving drum dials and the like. Since the controlling action of the speedometer in each case involves merely the admission or cut-off of a light beam, no additional load is imposed on the instrument which can impair its normal indicating accuracy. Similarly, normal operation of the cut-out relay 52 is not impaired by the addition of the contact pair 51. Thus the combination of the invention, by utilization of existing instrument operational elements, is achieved with maximum simplicity and economy. If desired to meet particular conditions, however, separate sensing means such as individual tachometers, comparison or bridge circuit means or the like, may be employed to bring the factors of vehicle speed and engine speed into cooperative control availability in the same manner as described. Furthermore, it will be obvious that the same operational combinations shown are equally applicable to headlight systems employing high and low illuminating means or dimmers combined in single units instead of the separate large and small housings shown as examples. Thus, while the invention has been set forth in preferred form it is not limited to the precise embodiments illustrated, as various modifications may be made without departing from the spirit of the invention within the scope of the appended claims.

What is claimed is:

1. In an automatic headlight control system for a vehicle having a driving engine and high and lower power headlight means, in combination, means to selectively energize said high power and said lower power headlight means, and dual detecting means responsive respectively to speed conditions of said vehicle and rotational speed conditions of said engine for jointly controlling said energizing means.

2. In an automatic headlight control system for a vehicle having a driving engine and high and low power headlight means, in combination, means to detect the speed condition of said vehicle, means to detect the rotational speed of said engine, means including switching means normally establishing an electrical energizing circuit through one of said headlight means, said switching means being operable when actuated to switch said circuit from said first headlight means to said other headlight means, means controllable by said vehicle speed detecting means to actuate said switching means, and means controllable by said engine speed detecting means to disable said actuating means.

3. In an automatic headlight control system for a vehicle having a driving engine and high and low power headlight means, in combination, a speedometer on said vehicle, electrical means including a relay adapted to normally establish an energizing circuit through said high power headlight means, said relay being operable when activated to switch said circuit from said high to said low power headlight means, means photo-electrically controllable by said speedometer to activate said relay, and means controllable by lubricant pressure of said engine to disable said activating means.

4. In an automatic headlight control system for a vehicle having a driving engine and high and low power headlight means, in combination, electrical means including a relay adapted to normally establish an operating circuit through said high power headlight means, said relay being operable when energized to switch said operating circuit from said high power to said low power headlight means, a speedometer on said vehicle, circuit means to energize said relay including a light-sensitive activating element associated with said speedometer, a light source associated with said speedometer, means operable by said speedometer to establish a light path from said source to said element when said speedometer is in zero speed indicating position and to cut off said path when said speedometer moves from said zero indicating position, and means responsive to the rotational speed of said engine to extinguish said light source when said rotational speed rises to a predetermined value.

5. The combination according to claim 4 wherein said speedometer includes a moving hand, and said light path establishing means includes a mirror attached to said hand and adapted to reflect light from said source to said activating element when said hand is in said zero position.

6. The combination according to claim 4 wherein said light path establishing means includes a shutter movable by said speedometer and having an aperture disposed in optical alignment between said light source and said element when said speedometer is in said zero position.

7. In an automatic headlight control system for a vehicle having a driving engine and high and low power headlight means, in combination, electrical means including a relay operable to normally establish an operating circuit through said high power headlight means, said relay being adapted when activated to switch said circuit from said high to said low power headlight means, means to detect the speed of said vehicle, means controllable by said vehicle speed detecting means to activate said relay, electrical means to detect the rotational speed of said engine, and means controllable by said electrical detecting means to disable said relay activating means.

8. In an automatic system for selectively controlling high power and low power headlight means on a vehicle having a driving engine and a charging generator driven by said engine, in combination, electrical means including a relay operable to normally maintain an operating circuit through said high power headlight means and adapted when activated to switch said circuit from said high to said low power headlight means, means to detect the speed of said vehicle, means controllable by said vehicle speed detecting means to activate said relay, and means controllable by output voltage of said generator to disable said relay activating means.

9. In an automatic headlight control system for a motor vehicle having high power and low power headlight means and an engine-driven generator for charging the battery of said vehicle, in combination, electrical means including a relay operable normally to maintain an operating circuit through said high power headlight means and adapted when activated to switch said operating circuit from said high to said low power headlight means, means to detect the speed of said vehicle, means controllable by said detecting means to activate said relay, means forming a circuit from said generator to said battery while said generator is operating at charging speed, a cut-off device operable to break said last-named circuit when said generator falls below said charging speed, and means on said cut-off device to disable said relay activating means when said generator gains said charging speed.

10. In an automatic headlight control system for a vehicle having high and low power headlight means and a driving engine operable at variable rotational speeds with respect to the linear speed conditions of said vehicle, in combination, means to detect said vehicle speed, switching means operable normally to establish an energizing electric circuit through said high power headlight means and shiftable to switch said circuit from said high to said low power headlight means, electrical circuit means controllable by said vehicle speed detecting means to actuate said shifting means solely when said vehicle speed condition is substantially zero, and second detecting means responsive to said rotational speed of said engine and cooperative with said vehicle speed detecting means to maintain said activating electrical circuit during low speed operation of said engine and to disable said activating circuit in response to a predetermined increase in said rotational speed.

References Cited in the file of this patent

UNITED STATES PATENTS

| | | |
|---|---|---|
| 2,771,597 | Freedman | Nov. 20, 1956 |
| 2,802,197 | Weiss | Aug. 6, 1957 |
| 2,983,844 | Shano | May 9, 1961 |